INVENTORS
HARRY J. LAJEUNESSE
MICHAEL C. J. COWPLAND
JOHN L. HANNA
BY Curphey & Erickson
PATENT AGENTS INVENTORS
HARRY J. LAJEUNESSE
MICHAEL C.J. COWPLAND
JOHN L. HANNA
BY Curphey & Erickson
PATENT AGENTS United States Patent Office 3,463,723

Patented Aug. 26, 1969

3,463,723

METHOD OF CONTROLLING THE ADJUSTMENT OF FREQUENCY DETERMINING FILM RESISTORS IN AN OSCILLATOR

Harry J. Lajeunesse, Michael C. J. Cowpland, and John L. Hanna, Ottawa, Ontario, Canada, assignors to Northern Electric Company Limited, Montreal, Quebec, Canada Filed Feb. 7, 1968, Ser. No. 703,604

Int. Cl. C23b *9/00;* B01k *3/00*

U.S. Cl. 204—140 5 Claims

ABSTRACT OF THE DISCLOSURE

A method of controlling the anodization and hence the adjustment of frequency determining thin film resistors in an oscillator by monitoring the period rather than counting the frequency of the output signal therefrom. This comprises counting the number of cycles from a substantially higher frequency reference oscillator during one or more periods of the adjustable oscillator; and utilizing the count to terminate the anodization of the thin film resistor once the desired output signal frequency has been reached.

Figure 1:
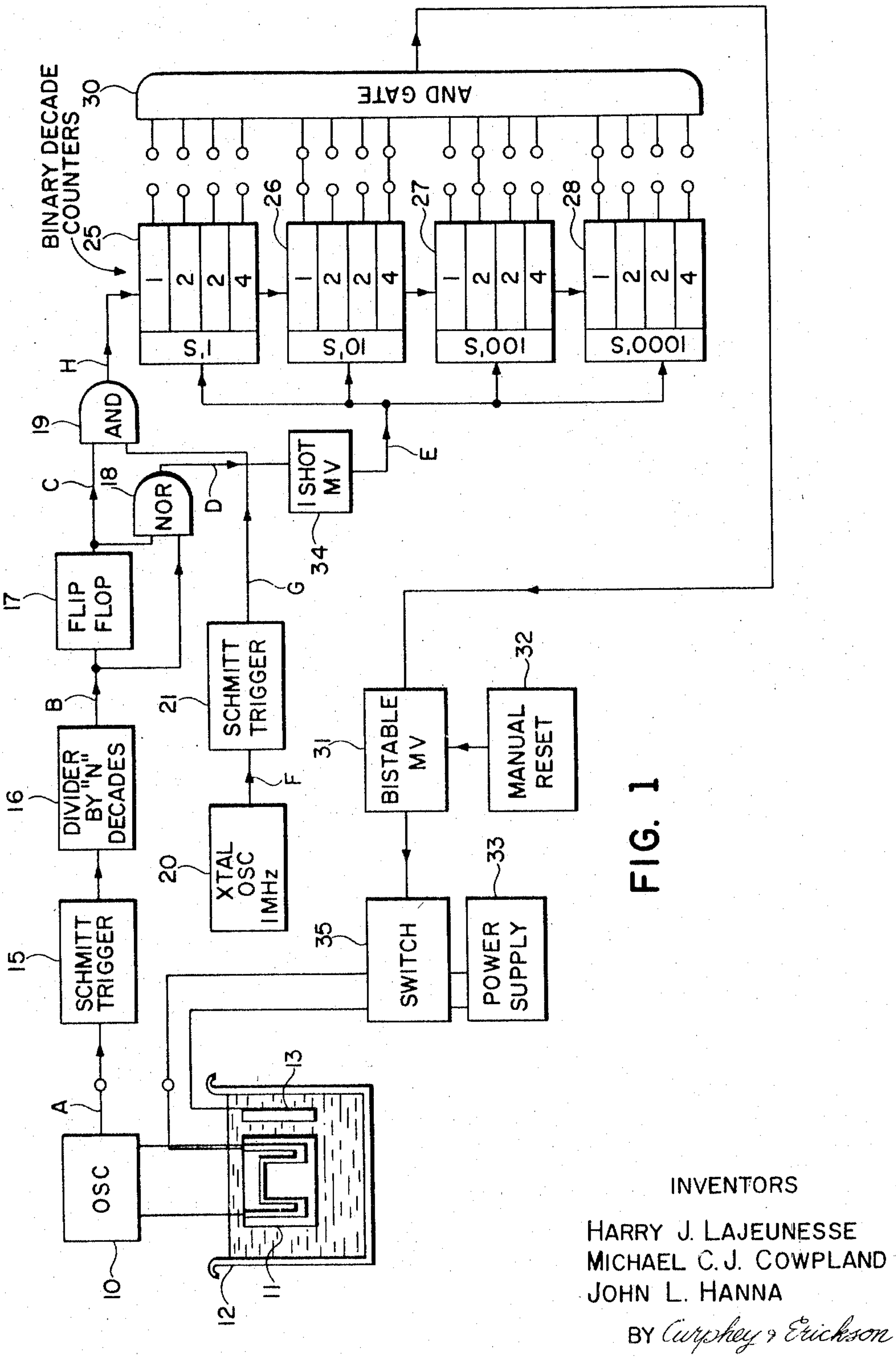

This invention relates to a method of monitoring the frequency of an oscillator and controlling the adjustment of frequency determining film resistors therein.

In the design of microcircuit oscillators, thin film resistors are often utilized to determine the output frequency. One common arrangement uses a twin-T resistor-capacitor (R–C) network as the frequency determining component. In general, it has been found very difficult to control the values of the frequency determining components so that an accurately controlled oscillator frequency will be obtained initially. Therefore, the networks are usually designed to be adjusted.

In order to adjust the ocsillator frequency, the value of the frequency determining resistors are selected so that they will be below that which will be required to produce the desired frequency. The resistors are then subjected to anodization (which decreases their cross-sectional area and thereby raises their resistance) while the frequency is monitored and the process is terminated once the desired frequency is reached.

In large scale production of the such oscillators, the adjustment time, which includes the frequency measuring interval, and the quantity of test equipment required to adjust each oscillator to the desired frequency, must be kept to a minimum in order to have an economical operation. One method commonly employed utilizes a single frequency counter together with means for sequentially interrogating a number of oscillators under test. However, the allowable tolerance of the final oscillator frequency limits the rate of change of the oscillator frequency for a given frequency measuring interval. For example, if the desired oscillator frequency is 1,000 Hz. and the tolerance is ±1 Hz., then the maximum frequency change between each measuring interval is 1 Hz.

One method of measuring the oscillator frequency utilizes a counter which counts the number of cycles over a predetermined period. If this method is used for the above example, it will be necessary to count the number of cycles from the oscillator for a complete second to stay within the ±1 Hz. tolerance. This results from the fact that all frequency counters are accurate to only ±1 count on the least significant digit regardless of how many significant digits there are. As a result, the rate of approach of the oscillator frequency with this method is limited to 1 Hz.

In a second method, the output signal of the adjustable oscillator is beat against a reference frequency signal and the mixer output therefrom is coupled to a narrow band-pass filter. When the desired oscillator frequency is obtained, a maximum output from the narrow band-pass filter is obtained which is utilized to cut off anodization. As an example, if the final oscillator frequency is to be 1,000 Hz., and the standard oscillator frequency is 1,500 Hz., the mixer output and hence the centre frequency of the narrow band-pass filter for a difference signal will be 1,500–1,000=500 Hz. when the oscillator is correctly adjusted. With a mixer output of 500 Hz., the Q of the narrow band-pass filter must be 500 in order to maintain the ±1 Hz. accuracy. Similarly, if the mixer output is 100 cycles per second, the Q of the narrow band-pass filter must be 100. As a result, the response time of $Q/fo=500/500=100/100=1$ second, will be the same regardless of the mixer output frequency. Hence, the rate of approach of the oscillator is again limited to 1 Hz.

In a typical example, the initial frequency offset of the oscillator is about 10 percent. Thus, for a final frequency of 1,000 Hz., a change of 100 Hz. would take 100 seconds in both the methods described above.

This problem has been partly overcome by utilizing a two-stage system in which the initial anodization rate is increased to 10 Hz. with a switch to an anodization rate of 1 Hz. when the oscillator frequency is offset by about 10 Hz. Thus, the total anodization time for an initial offset of 10 percent or 100 Hz. in the example is reduced to:

Anodization time for a change of 90 Hz. at a rate of 10 Hz.=9 seconds.

Anodization time for a change of 10 Hz. at a rate of 1 Hz.=10 seconds.

Total anodization time=19 seconds

While this provides a significant reduction in the anodization time, a more complex system is required since the system must supply two different anodizing currents and have two separate control systems.

It has been discovered that the disadvantages of the prior systems, of limited rate of approach of the oscillator frequency and the complexity of two stage networks, can be overcome by measuring the period of the oscillator frequency rather than the frequency directly. In accordance with the method of the present invention, a count is made of the number of cycles from a reference oscillator, which is gated by the output of the adjustable oscillator, for an interval of 1 period or multiple thereof. With a reference oscillator of 1·mHz., the number of cycles counted during one period of a 1,000 Hz. oscillator would be a thousand. Since the counter is again accurate of ±1 count, the tolerance of ±1 Hz. in a 1,000 Hz. is maintained. However, the time taken for the measurement in this case will be only one millisecond. The response time of this frequency detection system is therefore 1,000 times faster than the two previous systems for the same accuracy.

The rate of change of anodization is now limited only to the change in frequency occurring between sampling periods. Thus, if every other period of the adjustable oscillator were sampled, an approach speed of 500 Hz. is possible in the above example. The maximum practical anodization rate of the resistors results in a rate of change of about 10 Hz. However, because the measuring interval is now only a small fraction of the time taken for the oscillator to change 1 Hz., the method is readily adaptable to a sampling system in which a large number of oscillators are sequentially sampled and their anodization rate automatically controlled by a single counter thus providing a significant reduction in measuring equipment for a large scale operation.

An example embodiment of the invention will now be described with reference to the accompanying drawings in which:

FIGURE 1 is a block schematic diagram of a system for controlling the anodization of frequency dependent thin film resistors in an oscillator; and FIGURES 2A, 2B, 2C, 2D, 2E, 2F, 2G, and 2H are typical voltage waveforms versus time of signals at various reference points in FIGURE 1.

Referring to FIGURE 1, there is illustrated an adjustable oscillator 10 having a frequency determining thin film resistor 11 immersed in the electrolyte of a tank 12. In addition to the resistor 11, a spaced electrode 13 is also immersed in the electrolyte of the tank 12.

The output of the adjustable oscillator 10 is coupled to a Schmitt trigger 15 which converts the signal output of the oscillator 10 to a series of pulses that are more readily adapted for controlling gates. The output of the Schmitt trigger 15 is connected through a "N" decade frequency divider 16 (where N may be any integer) to the control input of a flip flop 17 and one input of a NOR gate 18. The output of the flip flop 17 is connected to one input of an AND gate 19 and the other input of the NOR gate 18.

In addition, the system comprises a 1 mHz. crystal controlled oscillator 20 which is used as a reference oscillator. The output of the crystal oscillator 20 is fed to a Schmitt trigger 21 which produces at its output a series of pulses that are fed to the other input of the AND gate 19. The output of the AND gate 19 is fed to cascaded binary decade counters 25, 26, 27 and 28.

Each of the binary decade counters 25–28 has binary coded decimal outputs 1–2–2–4 thus providing a count of 1 to 9. Because the counters 25, 26, 27 and 28 are connected in cascade, they will register units, tens, hundreds and thousands respectively. Any or all of the four outputs from the counters 25–28 may be strapped to the input of an AND gate 30 so as to provide a frequency count of from 1 to 9999. The output of the AND gate 30 is connected to a bistable multivibrator 31 which has a manual reset 32. The output of the bistable multivibrator 31 is, in turn, connected to a switch 35 which controls the flow of anodizing current from a power supply 33 to the thin film resistor 11 and the electrode 13. In addition, each of the counters 25–28 is reset from the output of a one-shot multivibrator 34 which is controlled by the output of the NOR gate 18.

The following is a typical example. For simplicity in illustrating the waveforms of FIGURES 2A to 2H, the ratios of the frequencies from the adjustable oscillator 10 and the crystal oscillator 20 are shown as being relatively small in comparison to that actually encountered. Normally, the frequency ratio would be at least two orders of magnitude and preferably three orders of magnitude to obtain accurate readings. Also, the output frequency of the adjustable oscillator 10 varies inversely as the resistance of the resistor 11. Hence, an increase in resistance decreases the output frequency of the oscillator 10, thereby lengthening the oscillator period which in turn increases the pulse count of the crystal oscillator 20 as hereinafter explained.

Figures 2, 2A:
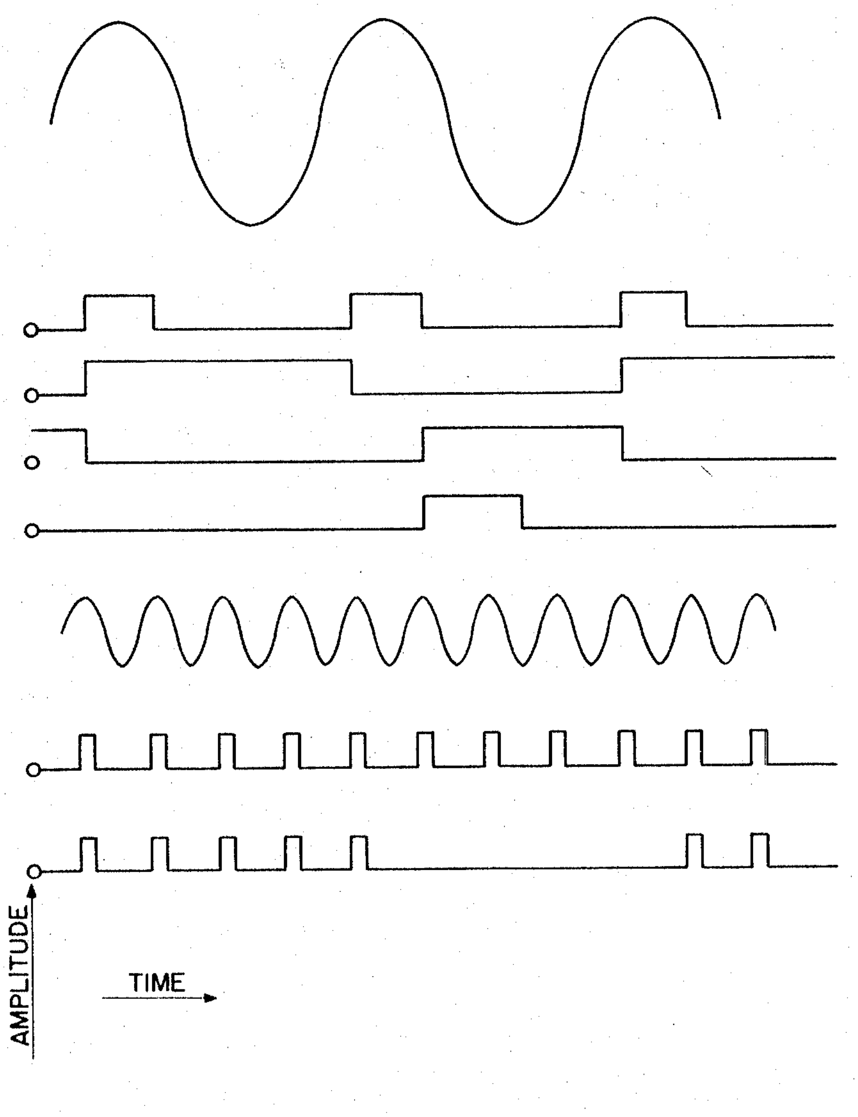

Referring to FIGURES 1 and 2, the signal ouput of the adjustable oscillator 10 at reference point A is illustrated in FIGURE 2A. After being fed through the Schmitt trigger 15 and the frequency divider 16, (which in the present example is set at unity), a series of pulses at reference point B, as shown in FIGURE 2B, are obtained. The pulses at reference point B are coupled through the flip flop 17 and appear at reference point C, such that the first pulse triggers the flip flop 17 on and the second pulse triggers it off; thus, providing a 2:1 frequency divider as shown in FIGURE 2C.

The output from the crystal oscillator 20, at reference point F, is a sine wave as shown in FIGURE 2F. This signal is coupled through the Schmitt trigger 21 which produces, at reference point G, a series of pulses as shown in FIGURE 2G. Both the pulses from reference points C and G are connected through the AND gate 19 thereby producing groups of pulses at reference point H, as shown in FIGURE 2H.

With the crystal oscillator frequency of 1 mHz. from the output of the oscillator 20, each series of pulses at reference point H represents the number of microseconds for one period of the signal from the adjustable oscillator 10. Each of these series of pulses, at reference point H, is counted by the binary decade counters 25–28. If, as an example, the final frequency of the oscillator 10 is to be 800 Hz., then a count of 1,000,000/800=1,250 Hz. will be required on the countries 25–28. To obtain this count, none of the binary outputs from the counter 25, the 1 and 4 binary outputs from counter 26, the 2 output from the counter 27, and the 1 output from the counter 28 are connected to the AND gate 30, so as to register an output from it when the stored count is 1,250 Hz.

If the initial frequency of the adjustable oscillator 10 is 900 Hz., the count from the binary counters 25–28 during each series of pulses from AND gate 19 will reach 1,000,000/900=1,111 Hz. Since the AND gate 30 is strapped to register a count of 1,250 Hz., there will be no output from it initially to actuate the bistable multivibrator 31.

At the end of the first period, the pulse output at reference point B actuates the flip flop 17 thereby cutting off the output at reference point C, thus preventing pulses from reference point G reaching point H. At the end of the pulse at reference point B, and with no output at reference point C, an output is obtained from NOR gate 18 at point D. This output triggers the one-shot multivibrator 34, which generates a reset pulse that appears at reference point E, as shown in FIGURE 2E. The reset pulse is applied to each of the counters 25–28 so as to recycle them.

Since during the initial cycle, the bistable multivibrator 31 was not triggered from the output of the AND gate 30, the switch 32 remains closed and anodizing current continues to flow from the power supply 33 to the thin film resistor 11 and the electrode 13. As a result, anodization continues thereby further decreasing the cross-sectional area of the thin film resistor 11 which in turn raises its resistance. This in turn lowers the output frequency of the adjustable oscillator 10 thereby lengthening the period of each cycle which results in a higher count from the crystal oscillator 20 in the counters 25–28 during the next measuring period. This action is repeated until an output is obtained from the AND gate 30 which triggers the bistable multivibrator 31 that, in turn, opens the switch 35 and disconnects the anodizing current from the power supply 33.

If the bistable multivibrator 31 fails to respond to the first output from the AND gate 30, each period from the output of the oscillator 10 will increase so that during each subsequent count, an output will be obtained from the AND gate 30. This provides a fail safe arrangement.

In the above-described embodiment, the period of output signal from the oscillator 10 varies directly as the resistance of the resistor 11. Hence, the count on the binary decade counters 25–28 will increase with anodization time. If the output period of the oscillator 10 varies inversely as the resistance of the resistor 11, the circuit can be made to function by substituting a one-shot multivibrator for the bistable multivibrator 31. During initial anodization of the resistor 11, the output frequency of the oscillator 10 will be too low, with a period longer than that required. Hence, an output from the AND gate 30 will be obtained during each count by the counters 25–28. The output from the AND gate 30 will, in turn, trigger the one-shot multivibrator (substituted for the bistable multivibrator 31) which is adapted to actuate and close the switch 35 for a preselected period that is shorter than the minimum time interval between counts.

As a result, anodization takes place for a brief period of time thereby increasing resistance of the resistor 11 which further increases the output frequency of the oscillator 10. This action is repeated until the period from the oscillator 10 falls below a predetermined value thus stopping any output from AND gate 30. As a result, the one-shot multivibrator (substituted for the bistable multivibrator 31) is not actuated and no further pulses of anodizing current are fed from the power supply 33 through the switch 32, to the resistor 11 and the electrode 13.

In the present embodiment, only a single oscillator 10 is coupled to the control circuit. Since the counting interval represents a relatively short period of the total time required to change the oscillator's frequency by 1 Hz., the control circuit can be readily adapted to control the anodization of a number of oscillators by sequentially interrogating the output signals from a number of oscillators and concurrently connecting the output of the AND gate 30 to individual bistable multivibrators 31 associated with separate switches 35 and power supplies 33. As a result, when an individual adjustable oscillator 10 reaches the desired frequency, an output will be obtained from the AND gate 30 which in turn actuates the bistable multivibrator 31 thereby opening the switch 35. Anodization will, of course, continue with the other oscillators until they reach the same frequency whereupon the respective switches 35 connected to them will open thereby disconnecting the associated power supplies 33.

In the above example, the frequency divider 16 was set at unity. If a more accurately controlled count of the output from the oscillator 10 is required, the measuring interval may be readily increased.

What is claimed is:

1. A method of controlling the adjustment of an oscillator having a frequency determining film resistor, said method comprising the steps of:

(a) applying an anodizing current between the film resistor and a spaced electrode immersed in an electrolyte so as to anodize the film resistor and thereby progressively increase the resistance thereof;

(b) gating the output of a reference oscillator, of substantially higher frequency than said adjustable oscillator, from the output of and for at least one period of said adjustable oscillator;

(c) counting the number of cycles of the gated output from the reference oscillator during said period; and (d) terminating the anodizing current when the number of cycles from the gated output during said period is a predetermined number.

2. A method as defined in claim 1 in which the frequency of the adjustable oscillator varies inversely as the resistance of the film resistor, and the anodizing current is terminated when the number of cycles from the gated output is at least equal to said predetermined number.

3. A method as defined in claim 2 in which the reference oscillator frequency is at least two orders of magnitude higher than that of the adjustable oscillator.

4. A method as defined in claim 2 in which steps (c) and (d) comprise:

(e) gating the output of the reference oscillator from the output of the adjustable oscillator;

(f) feeding the gated output to a plurality of binary decade counters;

(g) coupling preselected outputs from the counters, which register the preselected count, to an AND gating function; and (h) terminating the anodizing current in response to an output from the AND gating function.

5. A method as defined in claim 3 in which steps (c) and (d) comprise:

(e) gating the output of the reference oscillator from the output of the adjustable oscillator;

(f) feeding the gated output to a plurality of binary decade counters;

(g) coupling preselected outputs from the counters, which register the preselected count, to an AND gating function; and (h) terminating the anodizing current in response to an output from the AND gating function.

References Cited

UNITED STATES PATENTS

| | | | |
|---|---|---|---|
| 2,933,675 | 4/1960 | Hoelzle | 324—30 |
| 3,341,445 | 9/1967 | Gerhard | 204—228 |
| 3,282,821 | 11/1966 | Cistola | 204—228 |

JOHN H. MACK, Primary Examiner

R. L. ANDREWS, Assistant Examiner

U.S. Cl. X.R.

204—56, 228